June 11, 1940.　　　N. DANILS　　　2,203,776
AIR FILTERING APPARATUS
Filed Oct. 31, 1938　　　2 Sheets-Sheet 2
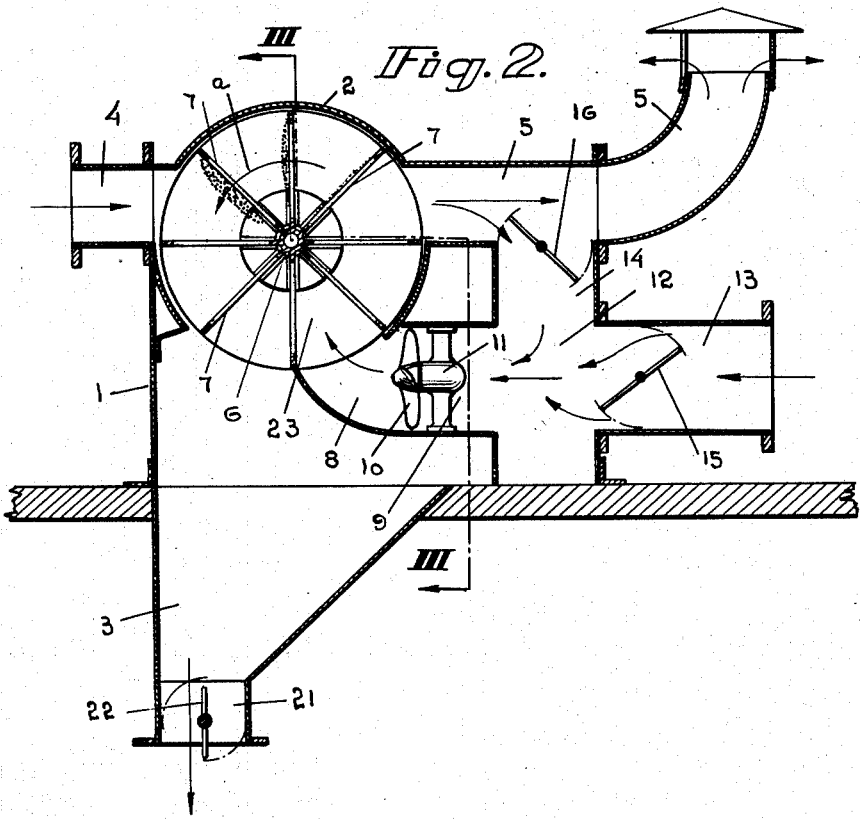
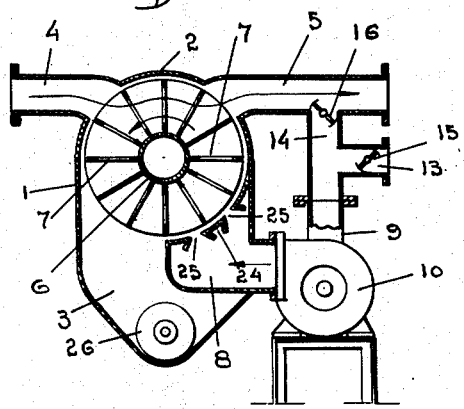
INVENTOR
NILS DANILS
BY *William C. Linton*
ATTORNEY

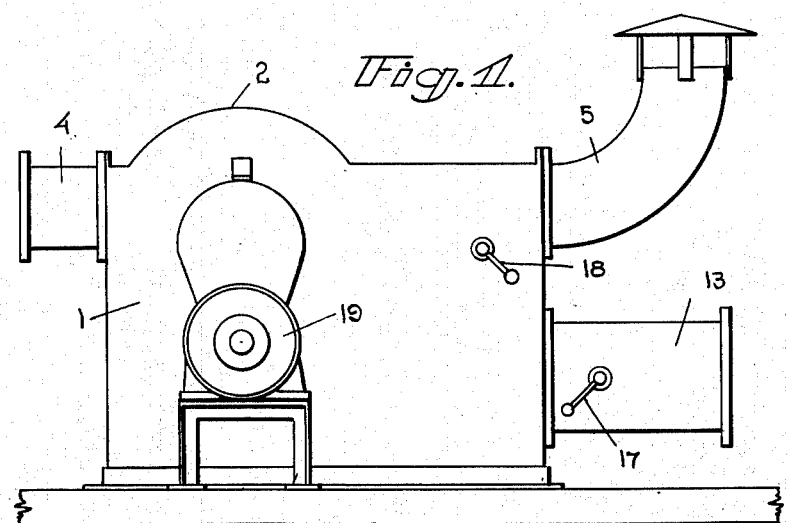
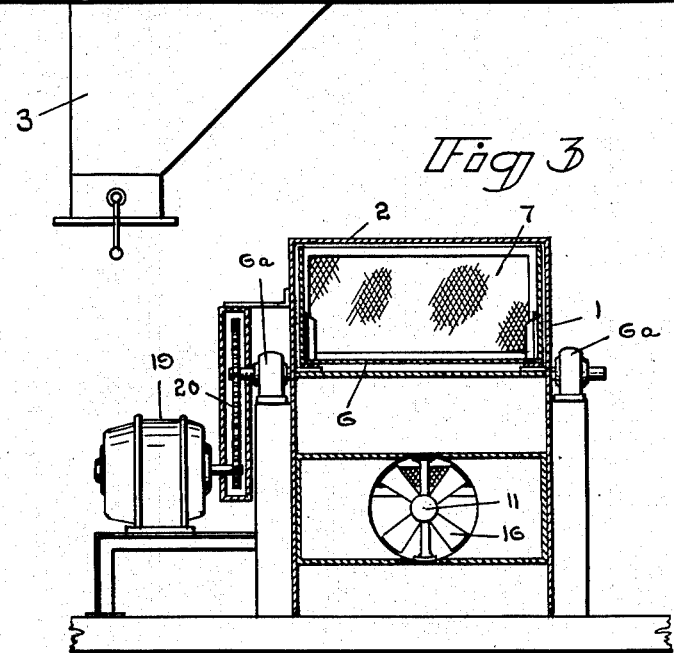

UNITED STATES PATENT OFFICE 2,203,776

AIR FILTERING APPARATUS

Nils Danils, Goteborg, Sweden

Application October 31, 1938, Serial No. 238,001
In Sweden November 24, 1936

3 Claims. (Cl. 183—63)

The present invention relates to air filtering apparatus of the kind which comprises a casing having an inlet and an outlet for the air to be treated and housing a rotating shaft carrying a number of substantially radially projecting filtering screens for catching particles suspended in the air, the lower portion of the casing being shaped as a receptacle for the particles caught by the screens, and means being provided for preventing the air from passing through the receptacle. More particularly the invention relates to air filtering apparatus of the kind set forth in which means are provided for rotating the shaft in such a direction that the screens in that portion of the casing through which the air is permitted to flow, are caused to move in a direction contrary to that in which the air is flowing.

The present invention provides air filtering apparatus of the kind set forth and characterised in that a chamber open toward the shaft of the filtering screens is provided between the receptacle and the outlet from the casing, and that means are provided for supplying pressure air to said chamber.

In the accompanying drawings Figure 1 is a side elevation of my improved filtering apparatus, Figure 2 is a longitudinal vertical section through the apparatus, Figure 3 is a vertical cross section along the line III—III in Figure 2, and Figure 4 is a diagrammatic section through a modified embodiment of my invention.

Referring first to Figures 1–3, 1 denotes a casing the top portion 2 of which is shaped to conform to a portion of the surface of a cylinder and the lowermost portion of which forms a receptacle 3. The casing 1 is provided with an inlet 4 through which the air to be treated is pressed into the casing, and at the opposite side with an outlet 5 for the air. Within the casing 1 a shaft 6 is rotatably mounted in bearings 6a and from this shaft 6 eight rectangular screens 7 project substantially radially forming walls crossing the path of the air current. These screens or walls consist of a suitable filter cloth or the like, and the shaft 6 is so located that when it rotates the outer edges of the screens will move near the inner side of the top portion 2 of the casing 1.

Within the casing 1 there is between the receptacle 3 and the outlet 5 provided a pressure air chamber 8 open towards the screens, and in the air supply conduit 9 to said chamber there is provided a fan 10 driven by an electrical motor 11. The air supply conduit 9 is connected to a chamber 12, to which fresh air is admitted through a conduit 13 and which is through a branch conduit 14 connected to the outlet 5. In the fresh air conduit 13 as well as in the branch conduit 14 there is provided a regulating valve 15 and 16 respectively, which valves may be adjusted by means of handles 17 and 18 respectively.

The shaft 6 with the screens 7 is rotated by an electric motor 19 acting on the shaft through a transmission 20.

The apparatus operates in the following manner:

The screen which is nearest the inlet of the casing catches most of the particles suspended in the air current passing through the casing and the following two screens complete the cleaning of the air. When a suitable time has passed, the shaft 6 is rotated in the direction of the arrow a through an angle corresponding to the angular distance between the adjacent screens. That one of the three upper screens which is nearest the inlet will thus be brought to a horizontal position and the pressure exerted upon its upper side by the incoming air and the weight of the particles caught at the opposite side of the same will cause the particles to drop down into the receptacle 3. The particles collected in the receptacle can be removed through an opening 21 normally closed by a valve 22.

The air supply to the chamber 8 is so chosen that in the space 23 between two adjacent screens 7 in front of said chamber 8 a pressure will be maintained sufficient to prevent the air passing through the receptacle 3 and the lower screens 7. Thus the air will be caused to pass through the three upper screens 7.

A portion of the air within outlet 5 will pass valve 16 downwardly through branch conduit 14 and thereafter mix with the air from conduit 13, whereby the air entering conduit 8 will be substantially of a temperature similar to the temperature of the air entering inlet 4, in order to prevent condensation of moisture within the apparatus.

In the modified arrangement shown in Figure 4, the pressure chamber 8 is at its inner side provided with a wall 24 in the shape of a portion of a cylinder, and this wall 24 is provided with nozzles 25 directed against the lowermost screens 7. The air escaping through the nozzles 25 with great velocity prevents the air flowing through the receptacle 3 and the lower screens 9. At the bottom of the receptacle 3 there is provided a conveying screw 26 for removing the particles collected in the receptacle out of the same.

What I claim is:

1. An air filtering apparatus comprising a casing having an inlet and outlet for air to be treated therein, a series of radially extending filtering screens for catching particles suspended in air being rotatably mounted within said casing and interpositioned between said inlet and said outlet, a portion of said casing below said screens formed as a receptacle for the particles caught by said screens, means for rotating said screens in a direction opposite to the direction of flow of air coming from said inlet, means capable of directing air under pressure towards some of said screens for preventing air from said inlet from passing through those screens and into said receptacle portion of said casing, and means introducing air under pressure to within said air directing means.

2. An air filtering apparatus comprising a casing having an inlet and outlet for air to be treated therein, a series of radially extending filtering screens for catching particles suspended in air being rotatably mounted within said casing and interpositioned between said inlet and said outlet, a portion of said casing below said screens formed as a receptacle for the particles caught by said screens, means for rotating said screens in a direction opposite to the direction of flow of air coming from said inlet, an air supply conduit opening towards the lower of said screens, said air conduit being connected to said casing outlet for maintaining the temperature of the air in said conduit relatively equal to the temperature of the air entering said inlet, and means placing air entering said conduit under pressure and directing the air towards said lower screens.

3. An air filtering apparatus comprising a casing having an inlet and outlet for air to be treated therein, a series of radially extending filtering screens for catching particles suspended in air being rotatably mounted within said casing and interpositioned between said inlet and said outlet, a portion of said casing below said screens formed as a receptacle for the particles caught by said screens, means for rotating said screens in a direction opposite to the direction of flow of air coming from said inlet, an air supply conduit opening towards the lower of said screens, nozzles mounted in the end of said conduit towards said screens and means placing air entering said conduit under pressure and directing the air to said nozzles.

NILS DANILS.